UNITED STATES PATENT OFFICE 2,636,905

ARALKYLATED BIS-PHENOLIC COMPOUNDS

Henry J. Kehe and Jacob E. Jansen, Akron, Ohio, assignors to The B. F. Goodrich Company, New York, N. Y., a corporation of New York No Drawing. Application May 23, 1950,
Serial No. 163,807

5 Claims. (Cl. 260—619)

This invention relates to a new class of chemical compounds and more specifically pertains to certain aralkylated bis-phenolic compounds and to a method of making the same.

We have discovered that the condensation of alkylidene bis-phenols with aryl-substituted alkene hydrocarbons such as styrene and alpha-methyl styrene, proceeds smoothly to produce in high yields novel aralkylated bis-phenolic compounds which are quite useful for a number of purposes. They are generally useful as anti-oxidants and age resisters for the preservation of materials which deteriorate in the presence of oxygen and on aging, and are particularly valuable in the preparation of rubber articles to preserve them from the deleterious effects of oxygen and other influences. Other specific similar uses include the preservation of lubricating oils, animal and vegetable oils and fats, soap, carotene, etc., from deterioration by oxidation. Still other uses for these compounds are found in the preparation of resinous materials. For example they can be condensed with aldehydes such as formaldehyde to produce resins of the phenol-formaldehyde type, or the phenolic groups can be esterified by reaction with allyl chloroformate or acrylyl chloride or the like to form non-thermoplastic poly-unsaturated ester resins.

The aralkylated compounds of this invention can be represented by the following general formula:

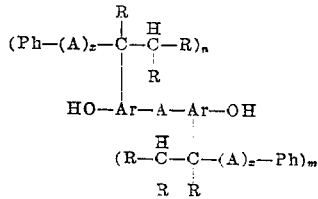

where Ar is an aromatic hydrocarbon radical having its connecting valences on nuclear carbon atoms, each A is an alkylidene radical, Ph is an aryl hydrocarbon radical, each R is hydrogen or a hydrocarbon group, $n$ is an integer from 1 to 2. $m$ is a number from 0 to 2 and $x$ is a number from 0 to 5. The preferred compounds having the above formula are those having 7 to 25 carbon atoms in the Ar—A—Ar structure and 8 to 13 carbon atoms in each of the

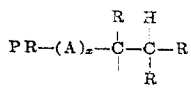

structures.

As mentioned above, the aralkylated phenolic compounds having the above general formula are prepared by condensing a bis-phenolic compound with an aralkylene hydrocarbon. The condensation is effected in the presence of a small amount of a condensation catalyst and proceeds substantially according to the following reaction equation:

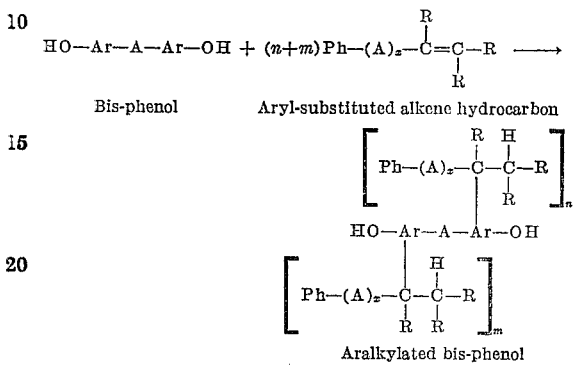

where Ar, A, Ph, R, $m$, $n$, and $x$ all have the significance as described above. The amount of catalyst required for the condensation process is from 0.01 to 5% by weight of the bis-phenol reactant employed.

In preparing the aralkylated phenols of this invention there can be used as the hydrocarbon reactant any aryl-substituted alkene hydrocarbon having the general formula:

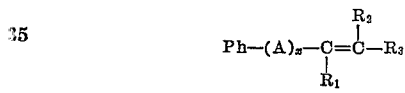

where Ph, A, $R_1$, $R_2$, $R_3$ and $x$ all have the same significance as hereinbefore described. Examples of such hydrocarbons include styrene, alpha-methyl styrene, p-methyl styrene, alpha-methyl-p - methyl - styrene, beta - methyl styrene, 2-methylallyl benzene, 2 - methyl- 1,1 -di-phenyl-propene, allyl benzene, isopropenyl naphthalene, allyl naphthalene, propenyl benzene, 1-phenyl hexene, 6-phenyl hexene and 1-phenyl pentene, etc. The preferred hydrocarbon reactants are styrene and homologs of styrene.

Similarly, any bis-phenolic compounds having the formula HO—Ar—A—Ar—OH where Ar and A have the significance described above, can be employed as the other reactant. Examples of such alkylidene bis-phenols include bis-(4-hydroxyphenyl) methane; 2,2 - bis - (4 - hydroxyphenyl) propane; 2,2 - bis - (4 - hydroxyphenyl)

butane; 2,2 - bis - (4 - hydroxyphenyl) -4-methyl pentane; 1,1-bis-(4-hydroxyphenyl) ethane; bis-(4-hydroxy-2,6-dimethylphenyl) methane; 1,1-bis-(2,5 - dimethyl- 4 -hydroxyphenyl) propane; 2,2-bis-(3-methyl - 4 - hydroxyphenyl) propane; 2,2-bis-(3-isopropyl-4-hydroxyphenyl) propane; 2,2-bis-(3-phenyl - 4 - hydroxyphenyl) propane; 2,2-bis-(4-hydroxyphenyl) heptane; 3,3-bis-(4-hydroxyphenyl) pentane; bis - (4 - hydroxy - 1-naphthyl) methane, 1,2-bis-(4-hydroxyphenyl) ethane; 1,2-bis-(2-hydroxyphenyl) ethane; 1,5-bis-(4-hydroxyphenyl) pentane; 1,3-bis-(4-hydroxyphenyl) -2,2-diethyl propane and their homologs. Such bis-phenolic compounds are most easily prepared by the condensation of two moles of a monohydric phenol with a ketone or aldehyde, as it is known to those skilled in the art.

Materials which can be employed as catalysts for the condensation of the bis-phenolic compound with the hydrocarbon are for example such compounds as phosphoric acid, anhydrous hydrogen chloride, sulfuric acid, boron trifluoride, anhydrous aluminum chloride, zinc chloride and aryl and alkyl sulfonic acids. Although any of the named acidic materials are catalysts for the condensation process of this invention, only the sulfonic acids and dilute aqueous sulfuric acid, 25% to 50% by weight, will give high yields of the aralkylated bis-phenolic compounds. All the other acidic condensation catalysts although highly efficient for other alkylation processes, produce a rather large amount of by-products, especially products of the dimerization or polymerization of the hydrocarbon reactant. Accordingly, aqueous solutions of sulfuric acid containing 25% to 50% by weight of $H_2SO_4$, and sulfonic acids and their hydrates are the preferred catalysts, especially when the condensation process is carried out at atmospheric pressure and at temperatures of about 100 to 250° C.

In general the condensation process employed to prepare the aralkylated bis-phenolic compounds of this invention is easily controlled and requires no special type of equipment. Suitable equipment need only consist of a reaction vessel fitted with a means for heating and cooling the reactants, a means for measuring the temperature of the reactants, a stirrer, a reflux condenser to prevent loss of the volatile materials and a charging line. A preferred mode of operation involves first adding the catalyst and the bis-phenol reactant to the reaction vessel, where they are heated to a temperature of from 100° C. to near the boiling point of the hydrocarbon reactant. Then the hydrocarbon reactant is added slowly, preferably over the course of about one to three hours while the reaction mixture is being stirred. Then the resulting mixture is cooled. The catalyst is rendered inactive as by adding water or an aqueous solution of sodium carbonate or any other suitable salt of a strong base and weak acid. This mixture is then diluted with an organic solvent or diluent such as benzene and the resulting aqueous and benzene solution are separated. The benzene solution is washed with water to remove all traces of the catalyst or the products of its neutralization.

The washed benzene solution is then charged to distillation equipment where benzene and entrapped water are removed by distillation at atmospheric pressure. Then unreacted hydrocarbon, if any, is recovered at a slightly reduced pressure. Next dimerized or polymerized hydrocarbon, if any, is removed. Then unreacted bis-phenol is removed at about 1 to 10 mm. abs. pressure and 150° to 200° C. There remains in the distillation equipment a mixture of aralkylated bis-phenolic compounds which can be recovered, as such, or each individual aralkylated bis-phenolic compound can be recovered from this mixture by further fractional distillation at a further reduced pressure of about 0.1 mm. to 1.0 mm.

If it is desired that the resulting aralkylated bis-phenolic compounds be of a lighter color with a minimum of discoloration, the condensation is preferably carried out in the absence of air by purging the reaction system with an inert gas such as natural gas or nitrogen.

The following examples are given as illustrations of the method of preparing the aralkylated bis-phenolic compounds of this invention but it will be apparent to those skilled in the art that modification and variations may be made in the details therein described. In all examples the term "parts" is employed to designate parts by weight.

*Example I*

To a reaction vessel fitted with a means for heating and cooling its contents, a stirrer, a thermometer for measuring the reaction temperature, a reflux condenser, and a charging line, there is added 228 parts (1 mole) of 2,2-bis-(4-hydroxyphenyl) propane and 5 parts of p-toluene sulfonic acid. This mixture is heated to 140° C. and then 416 parts (4 moles) of styrene are added slowly over a period of two hours with stirring while the reaction temperature is maintained at 140±5° C. The resulting mixture is then cooled to about 75° to 80° C. and an aqueous solution of sodium carbonate is added to neutralize the acidic catalyst. Then benzene is added to dilute the reaction products. The benzene solution and the aqueous solution separate readily on standing. The benzene solution is recovered, washed with water several times, then charged to distillation equipment. Benzene and entrapped water are then removed by distillation at atmospheric pressure. The pressure in the distillation equipment is reduced slightly but no styrene or styrene dimer is found to be present. The pressure in the distillation equipment is further reduced to 0.75 mm. abs. but nothing distils over even at a vapor temperature as high as 200° C. indicating that no unreacted bis-phenol is present. The temperature is increased slowly and 20.4 parts of a material boiling at 200° C. to 270° C. is collected. (This material contains aralkylated monohydric phenols resulting from a split of the bis-phenol reactant during the aralkylation process.) Then as the temperature is further increased to about 280° C. nothing more distils over. The residual material 613.2 parts, a yield of 96%, contains the various ortho 1-phenyl-ethyl derivatives of 2,2'-bis-(4-hydroxyphenyl) propane, namely, 2,2'-bis-[3-(1-phenyl - 1-ethyl) -4-hydroxyphenyl)] propane, 2-[3,5-di-(1-phenyl - 1-ethyl) -4-hydroxyphenyl]-2'-[3'-(1-phenyl - 1-ethyl) - 4-hydroxyphenyl] propane and 2,2'-bis [3,5-di-(1-phenyl-1-ethyl) -(4-hydroxyphenyl)] propane. As this mixture cools it becomes increasingly viscous until at room temperature it becomes a nonflowable semi-solid product, its viscosity at 160° to 175° C. being comparable to that of ordinary table syrup. The observed molecular weight of this mixture as determined with a benzene solution is 460. Infra red absorption pattern shows that the product contains no ether oxygen linkage but only oxygen in OH groups.

EXAMPLE II 2,2'-bis-(4-hydroxyphenyl) propane and alpha-methyl styrene are condensed in the presence of dilute aqueous sulfuric acid, 25% H₂SO₄ by weight, employing the condensation process described in Example I. After the acid catalyst is removed from the benzene solution of the reaction products, the benzene solution is charged to distillation equipment. Benzene and entrapped water are then removed by distillation at atmospheric pressure. Unreacted alpha-methyl styrene and any dimer formed during the condensation process are then distilled off at reduced pressure. Then the pressure in the distillation equipment is reduced to 0.75 mm. and the still pot temperature is increased. All material distilling at a vapor temperature up to 200° C. at 0.75 mm. absolute pressure is discarded. At this point distillation is stopped and the still residue is removed and allowed to cool. In this manner yields of 90 to 97% of a mixture of aralkylated bis-phenolic compounds containing 2,2'-bis-[3-(1-phenylisopropyl)-4-hydroxyphenyl]propane, 2-[3,5-di-(1-phenylisopropyl) - 4 - hydroxyphenyl] - 2' - [3'-(1 - phenylisopropyl) - 4' - hydroxyphenyl]propane and 2,2'-bis-[3,5-di-(1-phenylisopropyl)-4-hydroxyphenyl]propane are obtained. This mixture of aralkylated bis-phenol propanes is also a very viscous, semi-solid material at room temperature becoming as fluid as table syrup at 170° to 180° C. The infra red absorption pattern of this material shows the absence of ether oxygen linkages and the presence of OH groups.

EXAMPLE III 198 parts of bis-(4-hydroxyphenyl) methane and 472 parts of allyl benzene are condensed at 160±5° C. in the presence of aqueous sulfuric acid containing 50% H₂SO₄ by weight, otherwise employing the condensation process and the method of recovery described in Example I. The still residue is allowed to cool to room temperature. The cool product is a mixture of aralkylated bis-para hydroxyphenyl methanes containing specifically bis-[3-(1-phenyl-2-propyl)-4-hydroxyphenyl]methane, 2-[3,5-di-(1-phenyl-2-propyl) - 4 - hydroxyphenyl] - 2' - [3' - (1-phenyl-2-propyl) - 4' - hydroxyphenyl]methane and 2,2' - bis - [3,5 - di-(1-phenyl-2-propyl) - 4 - hydroxyphenyl]methane.

EXAMPLE IV 528 parts of 2-methallyl benzene are condensed with 300 parts of bis-(4-hydroxy-1-naphthyl) methane at 170±5° C. in the presence of 5 parts of p-toluene sulfonic acid monohydrate, otherwise employing the same condensation conditions and recovery procedure as hereinbefore described. A mixture of aralkylated bis-phenolic compounds which is a solid somewhat resinous material at room temperature and exceedingly viscous at 175° C., is recovered as the desired product of this condensation. This mixture contains di-, tri- and tetra-(1-phenyl-2-methyl-2-propyl) nuclear substituted bis-(4-hydroxy-1-naphthyl)-methanes.

EXAMPLE V 680 parts of allyl naphthalene are condensed with 2,2-bis-(4-hydroxyphenyl) propane at 170±5° C. in the presence of 8 parts of p-toluene sulfonic acid, otherwise employing the same condensation process and the recovery procedure as hereinbefore described. A mixture of aralkylated bis-phenolic compounds which is a resinous material at room temperature and exceedingly viscous at 175° C. is recovered as the desired product of this condensation. Specifically, this mixture contains 2,2'-bis-[3-(1-naphthyl-2-propyl)-4-hydroxyphenyl] propane, 2-[3,5-di-(1-naphthyl - 2 - propyl) - 4 - hydroxyphenyl] - 2' - [3'-(1 - naphthyl - 2 - propyl) - 4 - hydroxyphenyl] propane and 2,2'-bis-[3,5-di-(1-naphthyl-2-propyl)-4-hydroxyphenyl] propane.

EXAMPLE VI 640 parts of 6-phenyl-hexene are condensed with bis-(4-hydroxyphenyl) methane in the presence of 8 parts of p-toluene sulfonic acid, otherwise employing the condensation process and recovery procedure hereinbefore described. A mixture of aralkylated bis-phenolic compounds which is resinous at room temperature and very viscous at elevated temperature, about 180° C., is recovered as the desired product of this condensation. Specifically, this mixture contains 2,2' - bis - [3 - (6 - phenyl - 2 - hexyl) - 4 - hydroxyphenyl] methane, 2 - [3,5 - di - (6-phenyl - 2 - hexyl) - 4 - hydroxyphenyl] - 2'-[3' - (6 - phenyl - 2 - hexyl) - 4' - hydroxyphenyl] methane and 2,2'-bis[3,5-di-(6-phenyl-2-hexyl)-4-hydroxyphenyl] methane.

Other of the bis-phenolic compounds can be condensed with any of the aryl-substituted alkene hydrocarbons hereinbefore named, according to the condensation process of this invention to produce novel aralkylated bis-phenols having the general formula herein set forth.

As mentioned above, the aralkylated bis-phenolic compounds of this invention are excellent antioxidants for polymeric organic rubbery materials. They can be employed as antioxidants in white and light-colored rubbery compounds for they are non-discoloring; they are also non-staining and can be employed as antioxidants in rubbery materials which are to be used in contact with white or light-colored surfaces.

Most other known phenolic compounds when employed as antioxidants for rubbery materials, although giving protection to the rubbery material from some deleterious effects of oxidation, do not impart any substantial improvement to the flex life of the rubbery material. However, the aralkylated bis-phenolic compounds of this invention also impart remarkably increased flex life to rubbery materials. This is illustrated by the following data obtained by vulcanizing at 280° F. rubber compositions containing 100 parts of natural crude rubber, 50 parts of carbon black, 5 parts of zinc oxide, 3 parts of stearic acid, 1 part of bis-(benzothiazyl) disulfide, and 3 parts of sulfur (A) without an antioxidant, and (B) with 2 parts of the product prepared in Example I added as antioxidant. Samples of these rubbery compositions which had been vulcanized for 40 minutes and 60 minutes were subjected to an accelerated aging test by keeping the samples in 212° F. circulating fresh air for 48 hours. Then these samples were placed in a De Mattia Flexometer and the number of flexures were recorded until a flex crack growth of a rating of 7, where a rating of 0 is no cracking and a rating of 10 is complete failure by crack growth. The following data indicates the flex life imparted to rubbery materials by aralkylated phenolic compounds.

Flex life of aged rubbery material

| Composition | Time of Vulcanization, Minutes | Flexures at Rating 3 | Flexures at Rating 7 |
|---|---|---|---|
| A—No antioxidant | 40 | 700 | 9,500 |
|  | 60 | 1,750 | 3,500 |
| B—Material of Example I as Antioxidant | 40 | 95,000 | 112,000 |
|  | 60 | 72,500 | 98,300 |

In general 1 to 5% of aralkylated phenolic compounds based on the rubbery material will be sufficient to give best antioxidant or age resisting properties to vulcanizates prepared from polymeric organic rubbery materials, especially natural and synthetic diene rubbery materials which are sulfur vulcanizable.

Although we have described our invention by way of specific preparations of specific compounds, we do not thereby desire or intend to limit ourselves solely thereto, for as hitherto stated, the reaction conditions as well as the precise proportions of reactants utilized may be varied and equivalent chemical compounds can be employed, if desired, without departing from the spirit and scope of this invention as defined in the appended claims.

We claim:

1. A composition of matter, useful as an antioxidant, composed of a mixture of aralkylated bis-phenolic compounds resulting from the reaction of an aryl-substituted alkene hydrocarbon with an alkylidene bis-phenol in the presence of an acidic condensation catalyst at a temperature of from 100° to 250° C., said mixture having at room temperature a semi-solid to resinous consistency and being free of compounds which boil below 200° C. at a pressure of 0.75 millimeter of mercury.

2. A composition of matter, useful as an antioxidant, composed of a mixture of aralkylated bis-phenolic compounds resulting from the reaction of a phenyl substituted alkene hydrocarbon with an alkylidene bis-phenol in the presence of an acidic condensation catalyst at a temperature of from 100° C. to 250° C., said mixture having a semi-solid to resinous consistency at room temperature and a viscous liquid consistency at an elevated temperature of about 175° C., and being free of compounds which boil below 200° C. at a pressure of 0.75 millimeter of mercury.

3. A composition of matter, useful as an antioxidant, composed of a mixture of 1-phenyl-1-ethyl substituted bis-phenolic compounds resulting from the reaction of styrene with an alkylidene bis-phenol in the presence of an acidic condensation catalyst at a temperature of from 100° C. to 250° C., said mixture having a semi-solid to resinous consistency at room temperature and a viscous liquid consistency at an elevated temperature of about 175° C., and being free of compounds which boil below 200° C. at a pressure of 0.75 millimeter of mercury.

4. A composition of matter, useful as an antioxidant, composed of a mixture of 1-phenylisopropyl substituted bis-phenolic compounds resulting from the reaction of alpha methyl styrene with an alkylidene bis-phenol in the presence of an acidic condensation catalyst at a temperature of from 100° C. to 250° C., said mixture having a semi-solid to resinous consistency at room temperature and a viscous liquid consistency at an elevated temperature of about 175° C., and being free of compounds which boil below 200° C. at a pressure of 0.75 millimeter of mercury.

5. A composition of matter, useful as an antioxidant, composed of a mixture of 1-phenyl-1-ethyl substituted 2,2-bis-(4-hydroxyphenyl) propanes resulting from the reaction of styrene with 2,2-bis-(4-hydroxyphenyl) propane in the presence of an acidic condensation catalyst at a temperature of from 100° C. to 250° C., said mixture being a non-flowable semi-solid product at room temperature and being free of compounds which boil below 280° C. at a pressure of 0.75 millimeter of mercury.

6. A composition of matter, useful as an antioxidant, composed of a mixture of 1-phenylisopropyl substituted 2,2-bis-(4-hydroxyphenyl) propane resulting from the reaction of styrene with 2,2-bis-(4-hydroxyphenyl) propane in the presence of an acidic condensation catalyst at a temperature of from 100° C. to 250° C., said mixture being a non-flowable semi-solid at room temperature and a viscous liquid at 170 to 180° C., and being free of compounds which boil below 200° C. at a pressure of 0.75 millimeter of mercury.

HENRY J. KEHE.
JACOB E. JANSEN.

References Cited in the file of this patent

UNITED STATES PATENTS

| Number | Name | Date |
|---|---|---|
| 2,057,690 | Moss | Oct. 20, 1936 |
| 2,224,837 | Rosenthal et al. | Dec. 10, 1940 |
| 2,432,356 | Underwood | Dec. 9, 1947 |